(12) United States Patent
Voo

(10) Patent No.: US 7,898,761 B1
(45) Date of Patent: Mar. 1, 2011

(54) MAGNETO RESISTIVE BIASING SCHEME WITH FAST RECOVERY AND MAXIMUM DYNAMIC RANGE

(75) Inventor: Thart Fah Voo, Singapore (SG)

(73) Assignee: Marvell International Ltd. (BM)

( * ) Notice: Subject to any disclaimer, the term of this patent is extended or adjusted under 35 U.S.C. 154(b) by 1470 days.

(21) Appl. No.: 11/313,884

(22) Filed: Dec. 20, 2005

Related U.S. Application Data

(60) Provisional application No. 60/692,074, filed on Jun. 20, 2005.

(51) Int. Cl.
*G11B 5/03* (2006.01)
(52) U.S. Cl. .......................................... 360/66
(58) Field of Classification Search .......... None
See application file for complete search history.

(56) References Cited

U.S. PATENT DOCUMENTS

| | | | | |
|---|---|---|---|---|
| 5,831,783 | A * | 11/1998 | Shinohara | 360/67 |
| 6,307,699 | B1 * | 10/2001 | Patti et al. | 360/66 |
| 6,819,515 | B1 * | 11/2004 | Iroaga | 360/66 |
| 2005/0259344 | A1 * | 11/2005 | Hashizume et al. | 360/66 |

* cited by examiner

*Primary Examiner* — Daniell L Negrón

(57) ABSTRACT

A system and method for providing a fast recovery for voltage bias applied to an MR sensor, when a voltage is applied to the MR sensor very quickly while the MR sensor transitions from an idle or sleep state to an active state includes an apparatus and method for adjusting the voltage and range applied to the MR sensor. The apparatus includes a circuit having a current biasing circuit for supplying a current bias to a transducer, a voltage biasing circuit configured to supply a voltage bias to a transducer, and a charge pump for maintaining the current bias and the voltage bias at the maximum range so that the voltage at the transducer is maximized. The method includes specifying the magneto resistive biasing voltage, measuring a resistance of the magneto resistive sensor, setting an internal reference resistance value to be near the measured resistance of the magneto resistive sensor, determining a code that specifies the amount of current that flows through the magneto resistive sensor, flowing current through the magneto resistive sensor by turning on a digital to analog converter adjustable resistor.

27 Claims, 12 Drawing Sheets

MAGNETO RESISTIVE BIASING SCHEME WITH FAST RECOVERY AND MAXIMUM DYNAMIC RANGE

CROSS-REFERENCES TO RELATED APPLICATIONS

This application claims the benefit of U.S. provisional application No. 60/692,074 filed Jun. 20, 2005, incorporated herein by reference.

BACKGROUND OF THE INVENTION

The invention relates to semiconductor circuits (ICs) and more particularly to a circuit used to provide magneto resistive biasing voltage with fast recovery.

Magneto resistive sensors are used to detect magnetic signals in various applications such as gauss probes, global positioning systems and magnetic storage hard drives. Magnetic storage hard drives use a magnetic coil to write signals onto magnetic media and use magneto resistive sensors to read signals from the magnetic media. The magneto-resistive sensors are current biased to maximize performance.

FIG. 1 is an example of a circuit used to bias the current for a magneto resistive sensor (MR) used in hard drives. The current bias circuit of FIG. 1 includes an external magneto-resistive sensor (RMR) 102, a reference digital to analog converter (REF_DAC) 104, an internal reference resistor (RMR_REF) 106 a resistor 108, a filter 110, a servo circuit 112, and a magneto resistive digital to analog converter (MR_DAC) 114. The REF_DAC 104 further includes a switch 116 and a resistor 118. Filter 110 is a capacitor. Servo circuit 112 further includes a comparator 120, a capacitor 122, a switch M2 124 and another capacitor 126. (MR_DAC) 114 further includes a set of switches 128A, 128B, and 128C arranged in series with a set of resistors 130A, 130B, and 130C such that the combination of switch 128A and resistor 130A, the combination of switch 128B and resistor 130B, and the combination of switch 128C and resistor 130C, are all arranged in parallel.

In FIG. 1 current is biased by first flowing a reference current IREF through the switch 116 which is grounded, and then through the resistor 118 and finally through the reference resistor 106 which is set to 50 ohm. The IREF generates a reference voltage (VREF) which in turn produces a low pass and heavily filtered gate voltage (VREF_G) at servo circuit 112 and switch M2 124 as well as a second reference voltage VREF_1. Since the MR_DAC 114 can be programmed according to the specifications of the system, the current at magneto-resistance sensor can be calculated. For example, if VREF=VREF_1 and MR_DAC are configured to match REF_DAC then the current at the magneto resistive sensor is IREF. However, if the magneto-resistance is not known, such as for example when the system is changing, then this circuit does not produce reliable results because it does not know the resistance. An example of when the system is changing is when the hard drive begins to spin up and the MR sensor transitions from an idle or sleep state to an active state.

Therefore, what is needed is a system and method for providing a fast recovery for voltage bias applied to an MR sensor, when a voltage is applied to the MR sensor very quickly while the MR sensor transitions from an idle or sleep state to an active state.

BRIEF SUMMARY OF THE INVENTION

Embodiments of the present invention provide techniques, methods, codes and apparatuses for providing a fast recovery for voltage bias applied to an MR sensor, when a voltage is applied to the MR sensor very quickly while the MR sensor transitions from an idle or sleep state to an active state. The apparatus includes circuits which provide a magneto resistance voltage bias in addition to a current bias. The technique method and code includes processes for operating the MR sensor in both the current mode and the voltage mode.

In embodiments of the present invention, an apparatus for providing a fast recovery for voltage bias applied to an MR sensor includes a circuit having a current biasing means for supplying a current bias to a transducer, a voltage biasing means for supplying a voltage bias to a transducer, and a charge pumping means for maintaining the current bias and the voltage bias at the maximum range so that the voltage at the transducer is maximized. The current biasing means for supplying a current bias to a transducer further includes a servo means for determining and delivering a current bias at a maximum range so that a voltage at the transducer is maximized. The voltage biasing means for supplying a voltage bias to a transducer further includes an error correction means for determining and delivering a voltage bias at a maximum range so that the voltage at the transducer is maximized. The charge pumping means further includes a means for maintaining a voltage bias at an output node between a first reference voltage and a second reference voltage.

In another embodiment the circuit can further include a switching means for engaging either the current biasing means or the voltage biasing means.

In yet another embodiment the circuit uses a slow amplifier having good rejection instead of a charge pump to maintain the voltage on the circuit.

In yet another embodiment the circuit can be implemented as an integrated circuit.

In yet another embodiment the charge pumping means of the circuit is coupled to a switching means for engaging either the current biasing means or the voltage biasing means.

In yet another embodiment the error correction means of the circuit includes an adjustable resistor means for adjusting the resistance to maximize the voltage biasing means and specifically to maximize the current bias and the voltage bias.

In another embodiment the circuit can further include a noise reduction means coupled to the charge pumping means, wherein the charge pumping means is used for reducing the noise within the circuit.

In another embodiment the circuit can further include a programmable resistor means for applying a variable resistance for maintaining the voltage at an output node between a first reference voltage and a second reference voltage.

Another embodiment of the present invention includes a means for voltage biasing a magneto resistive sensor for fast recovery and maximum dynamic range comprising a means for specifying the magneto resistive biasing voltage, a means for measuring a resistance of the magneto resistive sensor, a means for setting an internal reference resistance value to be substantially near the measured resistance of the magneto resistive sensor, a means for determining the amount of current that flows through the magneto resistive sensor, a means for adjusting the voltage to an output node to be between a first reference voltage and a second reference voltage. Turning on the digital to analog converter adjustable resistor can further include first turning off a first comparator and a first switch, then turning on the first comparator and a second switch; waiting for a period of time, and then turning off the first comparator and the second switch.

In yet another embodiment the means for voltage biasing a magneto resistive sensor for fast recovery and maximum dynamic range can further include a means for adjusting a voltage at the magneto resistive sensor to match a programmed voltage.

In yet another embodiment the means for voltage biasing a magneto resistive sensor for fast recovery and maximum dynamic range can further include a means for maintaining a voltage at the magneto resistive sensor after a first comparator and a second switch have been turned off.

Another embodiment of the present invention includes a means for voltage biasing a magneto resistive sensor for fast recovery and maximum dynamic range comprising a means for operating a circuit in current mode to adjust the current bias applied to the magneto resistive sensor, a means for operating the circuit in voltage mode to adjust the voltage bias applied to the magneto resistive sensor, and a means for switching between the current mode of operation and the voltage mode of operation. When the circuit is operated in current mode the means can further include the steps of specifying a magneto resistive biasing voltage, turning on a first comparator and a first switch during a speed up process so that a reference gate voltage is charged up, waiting for a period of time, and then turning off the first comparator and the first switch. When the circuit is operated in voltage mode the means can further include the steps of specifying the voltage bias applied to the magneto resistive sensor, measuring a resistance of the magneto resistive sensor, setting an internal reference resistance value to be substantially near the measured resistance of the magneto resistive sensor, determining a specific amount of current that flows through the magneto resistive sensor, and flowing current through the magneto resistive sensor by turning on a digital to analog converter adjustable resistor. Turning on the digital to analog converter adjustable resistor can further include the steps of first turning off a first comparator and a first switch, then turning on the first comparator and a second switch, waiting for a period of time, and then turning off the first comparator and the second switch. The switching means can be set up so that only one mode of operation can be operated at a given time.

In yet another embodiment the means for voltage biasing a magneto resistive sensor for fast recovery and maximum dynamic range can further include a means for adjusting a voltage at the magneto resistive sensor to match a programmed voltage.

In yet another embodiment the means for voltage biasing a magneto resistive sensor for fast recovery and maximum dynamic range can further include a means for maintaining the voltage settings after switching between the current mode of operation and the voltage mode of operation.

In yet another embodiment the means for voltage biasing a magneto resistive sensor for fast recovery and maximum dynamic range can further include a means for maintaining the reference gate voltage after the first comparator and the first switch have been turned off.

Another embodiment of the present invention includes a code for voltage biasing a magneto resistive sensor for fast recovery and maximum dynamic range comprising specifying the magneto resistive biasing voltage, measuring a resistance of the magneto resistive sensor, setting an internal reference resistance value to be substantially near the measured resistance of the magneto resistive sensor, determining the amount of current that flows through the magneto resistive sensor, flowing current through the magneto resistive sensor by turning on a digital to analog converter adjustable resistor. Turning on the digital to analog converter adjustable resistor can further include the steps of first turning off a first comparator and a first switch, then turning on the first comparator and a second switch; waiting for a period of time, and then turning off the first comparator and the second switch.

In yet another embodiment the code for voltage biasing a magneto resistive sensor for fast recovery and maximum dynamic range can further include using an error correction circuit to adjust a voltage at the magneto resistive sensor to match a programmed voltage.

In yet another embodiment the code for voltage biasing a magneto resistive sensor for fast recovery and maximum dynamic range can further include using a charge pump to maintain said voltage at the magneto resistive sensor after said first comparator and said second switch have been turned off.

Another embodiment of the present invention includes a code for voltage biasing a magneto resistive sensor for fast recovery and maximum dynamic range comprising the steps of operating a circuit in current mode to adjust the current bias applied to said magneto resistive sensor, operating the circuit in voltage mode to adjust the voltage bias applied to the magneto resistive sensor, and switching between the current mode of operation and the voltage mode of operation. The code for switching between the current mode of operation and the voltage mode of operation can be set up so that only one mode of operation can be operated at a given time.

When the circuit is operated in current mode the code can further include the steps of specifying a magneto resistive biasing voltage, turning on a first comparator and a first switch during a speed up process so that a reference gate voltage is charged up, waiting for a period of time, and then turning off the first comparator and the first switch.

When the circuit is operated in voltage mode the code can further include the steps of specifying the voltage bias applied to the magneto resistive sensor, measuring a resistance of the magneto resistive sensor, setting an internal reference resistance value to be substantially near the measured resistance of the magneto resistive sensor, determining a code that specifies the amount of current that flows through the magneto resistive sensor, and flowing current through the magneto resistive sensor by turning on a digital to analog converter adjustable resistor. Turning on the digital to analog converter adjustable resistor can further include the steps of first turning off a first comparator and a first switch, then turning on the first comparator and a second switch, waiting for a period of time, and then turning off the first comparator and the second switch.

In yet another embodiment the code for voltage biasing a magneto resistive sensor for fast recovery and maximum dynamic range can further include using an error correction circuit to adjust a voltage at the magneto resistive sensor to match a programmed voltage.

In yet another embodiment the code for voltage biasing a magneto resistive sensor for fast recovery and maximum dynamic range can further include engaging a charge pump to maintain the voltage settings after switching between the current mode of operation and the voltage mode of operation.

In yet another embodiment the code for voltage biasing a magneto resistive sensor for fast recovery and maximum dynamic range can further include using a charge pump to maintain the reference gate voltage after the first comparator and the first switch have been turned off.

DETAILED DESCRIPTION OF THE INVENTION

Embodiments of the present invention provide techniques, methods, codes and apparatuses for providing a fast recovery for voltage bias applied to a magneto resistive (MR) sensor or transducer, when a voltage is applied to the MR sensor very quickly while the MR sensor transitions from an idle or sleep state to an active state. The apparatus includes a circuit which provides a magneto resistance voltage bias in addition to a current bias. The method includes processes for operating the MR sensor in both the current mode and voltage mode.

Figure 1:
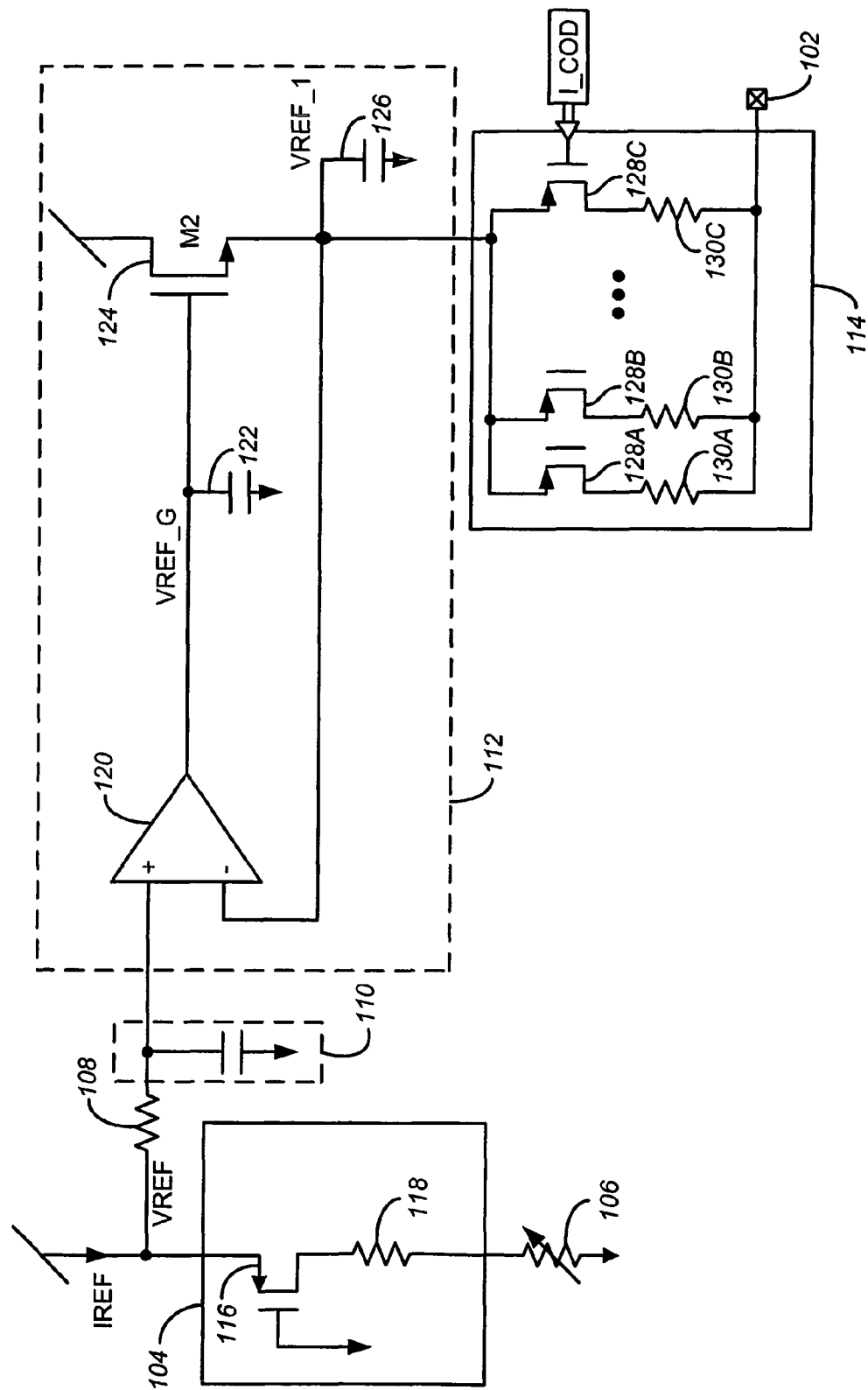
FIG. 1 is a prior art circuit used to bias the current for a magneto resistive sensor (MR) used in hard drives.
Figure 2:
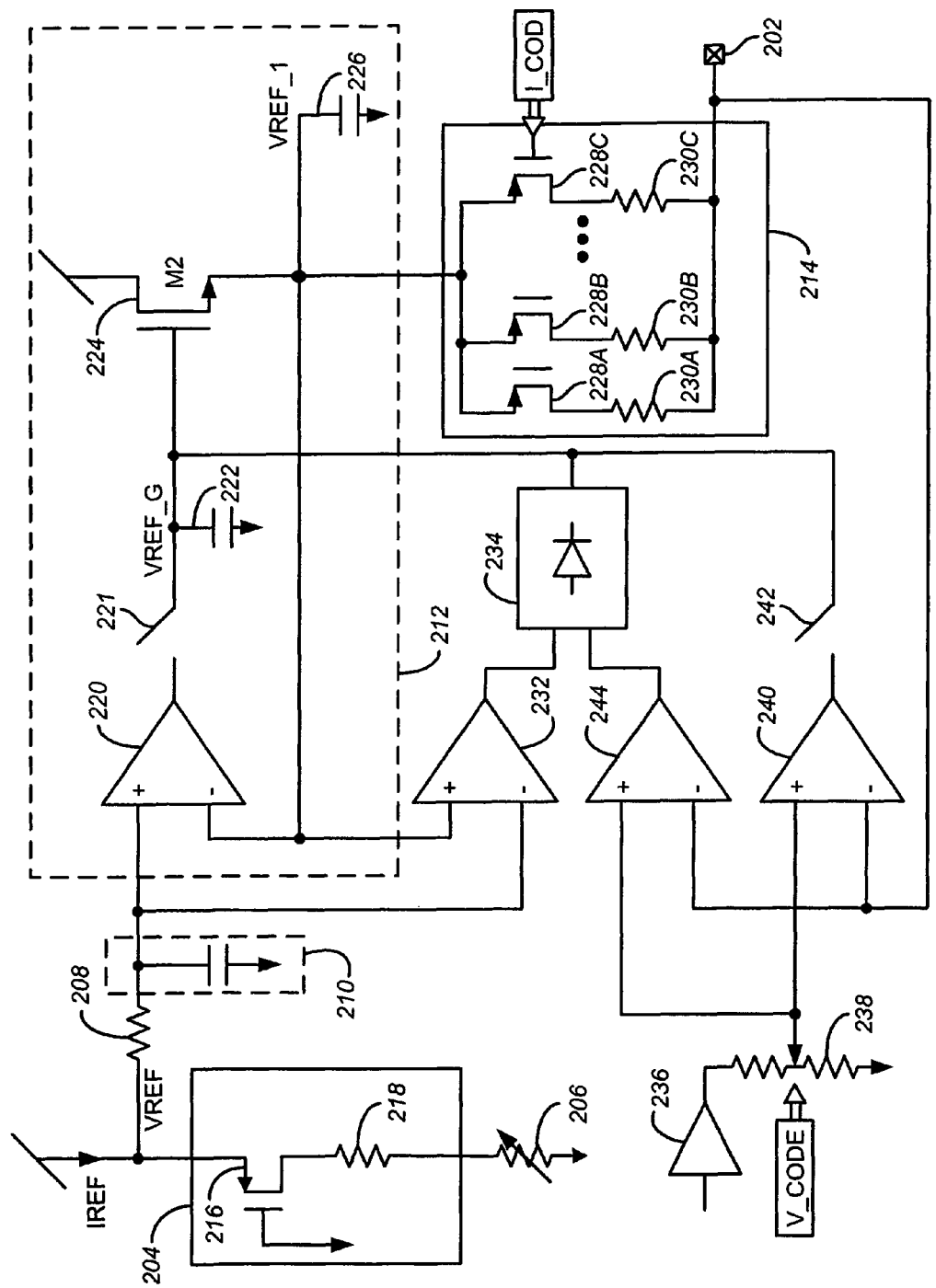
FIG. 2 is a circuit diagram used to provide magneto resistance voltage biasing with fast recovery and maximum dynamic range in accordance with one embodiment of the present invention.

FIG. 2 is a circuit diagram used to provide voltage biasing with fast recovery and maximum dynamic range to a magneto resistive sensor in accordance with one embodiment of the present invention. FIG. 2 includes a the circuit used to operate in current bias mode and a circuit used to operate in voltage bias mode. The circuit used to operate in voltage bias mode further includes a noise reduction circuit, an error correction circuit, and a voltage bias circuit.

The current bias circuit portion of FIG. 2 includes an external magneto-resistive sensor (RMR) 202, a reference digital to analog converter (REF_DAC) 204, an internal reference resistor (RMR_REF) 206, a resistor 208, a filter 210, a servo circuit 212, and a magneto resistive digital to analog converter (MR_DAC) 214. The REF_DAC 204 further includes a switch 216 and a resistor 218. Filter 210 is a capacitor. Servo circuit 212 further includes a first comparator (BUF1) 220, a first switch 221, a capacitor 222, a switch M2 224 and another capacitor 226. (MR_DAC) 214 further includes a set of switches 228A, 228B, and 228C arranged in series with a set of resistors 230A, 230B, and 230C such that the combination of switch 228A and resistor 230A, the combination of switch 228B and resistor 230B, and the combination of switch 228C and resistor 230C, are all arranged in parallel. The recovery time of the first comparator (BUF1) 220 can range from a few hundred nanoseconds to a microsecond. The comparators used throughout this specification are preferably operational amplifiers.

The noise reduction circuit portion of FIG. 2 includes a second comparator 232 and a charge pump 234 coupled to the servo circuit 212. The second comparator 232 has one input connected to the output after the filter 210 while the second input of the second comparator 232 is connected to an input of the first comparator (BUF1) 220. The output of comparator 232 is connected to the input of the charge pump 234. The output of charge pump 234 is connected to the output of the first comparator (BUF1) 220 after first switch 221. The recovery time of the second comparator 232 can be a few hundred nanoseconds.

The error correction circuit portion of FIG. 2 includes a voltage band gap 236, a resistor 238, a third comparator 240, and a second switch 242 coupled to switch M2 224 of servo circuit 212 and (MR_DAC) 214. The error correction circuit is used to solve the problem of delivering a specified voltage to the external magneto-resistive sensor (RMR) 202 when the resistance of the RMR 202 is not known and therefore the behavior of the entire circuit of FIG. 2 is not known. This error correction circuit works by adjusting the resistance of the MR_DAC 214 so that it is maximized for the circuit, and so that the voltage applied to the MR_DAC 214 and the voltage applied to the RMR 202 are also maximized. In one embodiment the resistance of the MR_DAC 214 can vary from 600 ohms to 5 Kohms. With this error correction circuit the ratio RMR 202 resistance to MR_DAC 214 resistance controls the voltage at RMR 202. The recovery time of the third comparator 240 can range from a few hundred nanoseconds to a microsecond.

The voltage bias circuit portion of FIG. 2 includes a fourth comparator 244 coupled to the output of resistor 238, third comparator 240, and charge pump 234. The voltage bias circuit is used to calculate and provide the voltage to the circuit including the magneto resistive sensor RMR 202 which is used for voltage biasing with fast recovery and maximum dynamic range. The voltage biasing circuit is configured to supply a voltage bias to an external magneto-resistive sensor (RMR) 202 and to adjust a voltage at an output node to be between a first reference voltage and a second reference voltage. In one embodiment the voltage bias supplied to an external magneto resistive sensor (RMR) 202 can be between 30 millivolts and 300 millivolts. Additionally, in embodiments the magneto resistive sensor can have a resistance ranging from 30 ohms to 500 ohms. The recovery time of the fourth comparator 244 can be a few hundred nanoseconds.

Since the circuit of FIG. 2 includes a magneto resistive sensor (RMR) 202 which can have an unknown resistance the circuit should be maximized for best performance. RMR 202 has an unknown resistance because its resistance changes in response to the magnetic signal it detects and because its resistance can vary depending on its design and construction. For example if the specified voltage for RMR 202 is 100 mvolts and the estimated resistance of RMR 202 is approximately less than 50 ohms, then according to V=IR the required current is 2 mAmps. The resistance of the MR-DAC 214 is then adjusted or programmed so that the circuit of FIG. 2 will produce 2 mAmps at the input of the MR_DAC 214. If the MR_DAC 214 is not programmed in this manner then the MR_DAC should be set for the worse case scenario which means that it is set so that its resistance is minimized. In this scenario the MR_DAC 214 resistance should be minimized because the resistance of the RMR 202 is unknown and the worse scenario should be accounted for. If the minimum resistance is used then the voltage at MR_DAC 214 should also be lowered causing the dynamic range to be lowered and therefore increasing the noise of the entire system. Therefore by programming the MR_DAC 214 to have a maximum resistance, the voltage at MR_DAC 214 can be maximized causing the dynamic range to be maximum and therefore the noise in the circuit to be reduced. Details of the methods used to maximize the circuit in FIG. 2 are discussed below with reference to FIGS. 6-8.

The circuit of FIG. 2 is further configured to address the different types of noise in the circuit once it is attached to a device such as the external magneto-resistive sensor (RMR) 202. Once the circuit in circuit of FIG. 2 is running it will be subject to noise from the power supply, noise from the device 202, and thermal noise from the MR_DAC 214. The noise from the power supply is filtered or rejected by a power supply regulator which is not shown. The noise from the devices 202 is filtered by a resistor-capacitor RC filter. Finally, the thermal noise of the MR_DAC 214 is reduced by increasing the values of the resistors 230A, 230B, and 230C in the MR_DAC 214. In the present invention it is advantageous to maintain the reference voltage VREF_1 at the maximum value that the power supply can produce for a given MR biasing current because if VREF_1 is maximized then so are the resistance values of the of resistors 230A, 230B, and 230C, which reduces the noise in MR_DAC 214. Additionally, maximizing the resistance of resistors 230A, 230B, and 230C improves the power supply rejection from regulated voltage VREF_1. Rejection is a measure of the amount of interference voltage that is filtered out or rejected in a circuit and can be quantified with values such as the common mode rejection ratio (CMRR) which is the ratio of the common-mode interference voltage at the input of a circuit, to the corresponding interference voltage at the output. In an operational amplifier such as the ones found in this circuit the rejection or CMRR describes the ability of the operational amplifier to reject interfering signals common to both inputs, and to amplify only the difference between the inputs. Maximizing the resistance of resistors 230A, 230B, and 230C also provides better voltage gain the amplifier which is attached to the external magneto-resistive sensor (RMR) 202, and is not shown.

Figure 3:
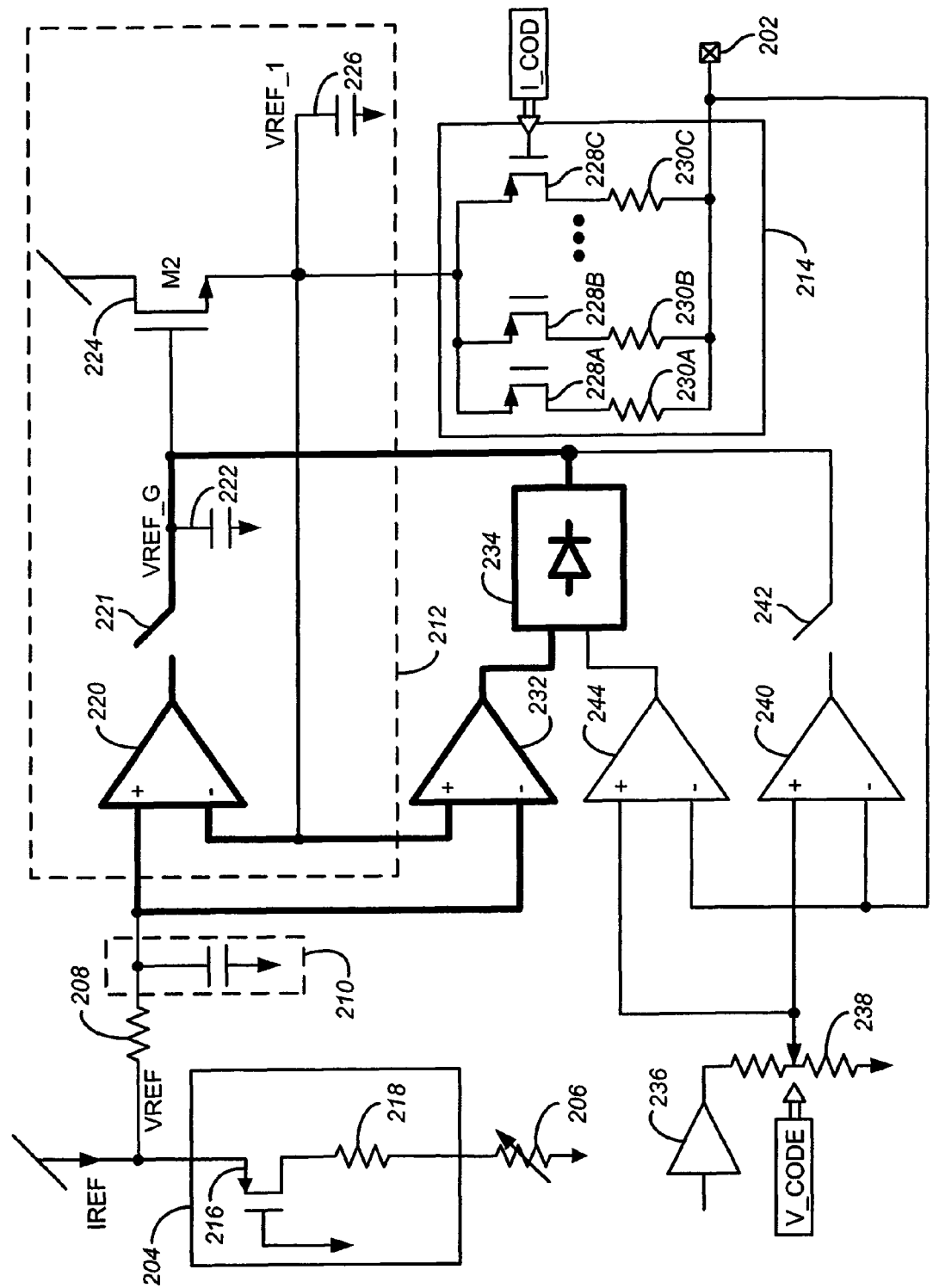
FIG. 3 shows in bold lines the noise reduction circuit portion of FIG. 2, which is used to reduce noise when current biasing the magneto resistive sensor, in accordance with one embodiment of the present invention
Figure 4:
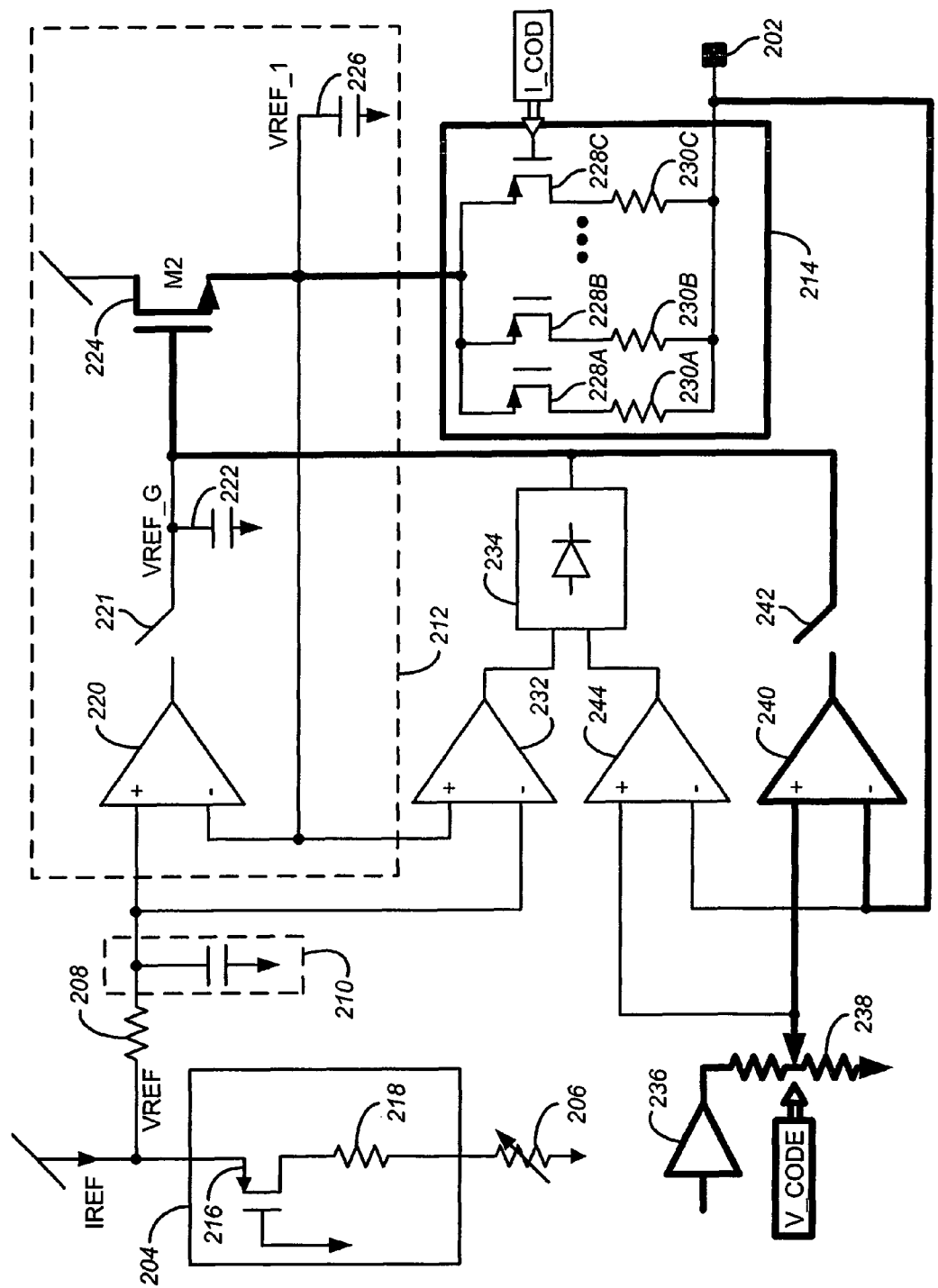
FIG. 4 shows in bold lines the error correction circuit portion of FIG. 2, which is used to voltage bias the magneto resistive sensor, in accordance with one embodiment of the present invention.
Figure 5:
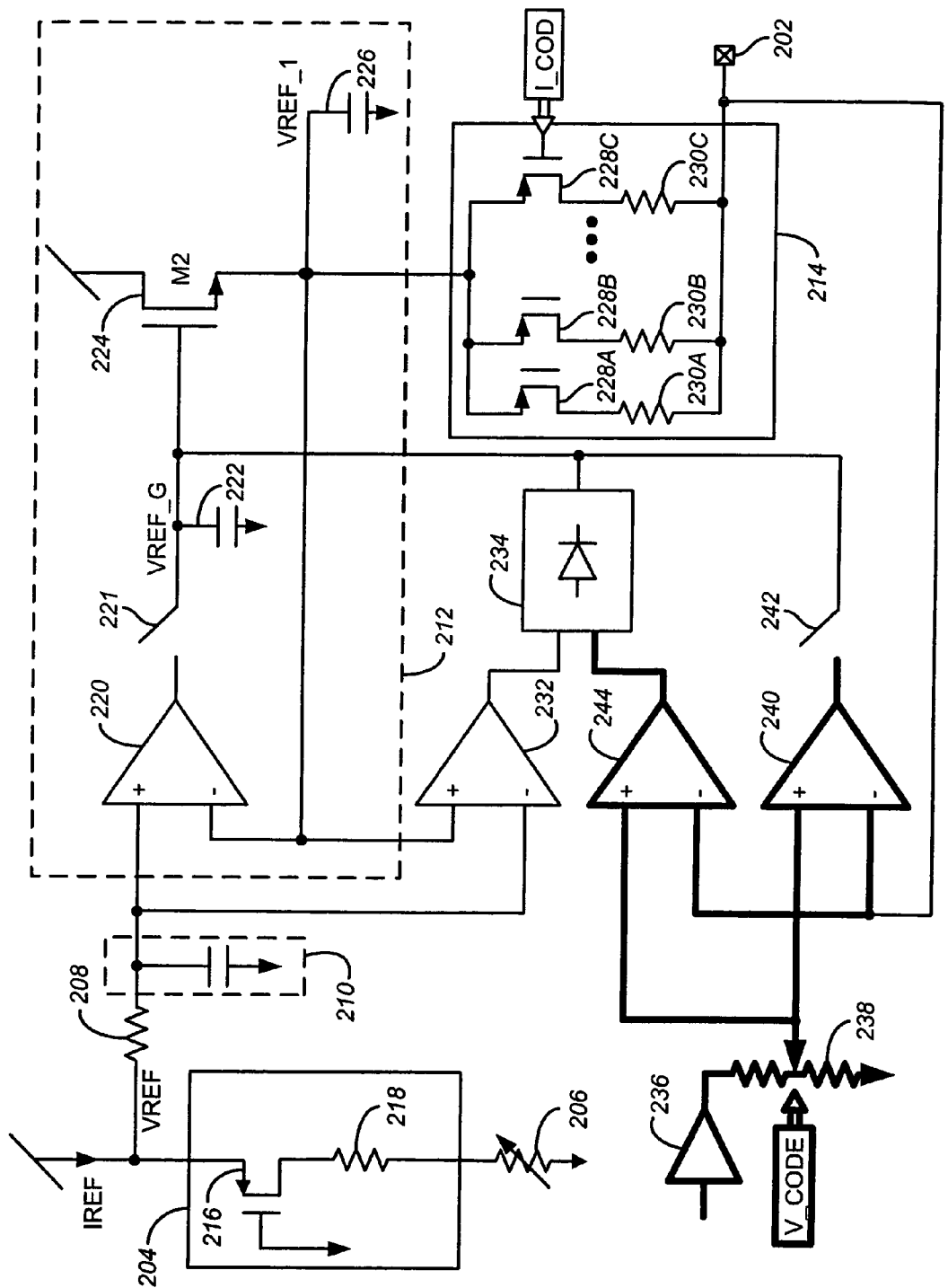
FIG. 5 shows in bold lines the voltage bias circuit portion of FIG. 2, which is used to operate the magneto resistive sensor under voltage mode, in accordance with one embodiment of the present invention.

FIGS. 3-5 highlight in bold lines the noise reduction circuit portion of FIG. 2, the error correction circuit portion of FIG. 2 and the voltage bias circuit portion of FIG. 2. Although these portions of the circuit operate together as one circuit used to provide voltage biasing with fast recovery and maximum dynamic range to a magneto resistive sensor, they are illustrated as portions for ease of discussion and so that one skilled in the art can recognize that other circuits can be interchanged to perform the similar tasks and that this invention is not limited to the circuit embodiment shown in FIG. 2. FIG. 3 shows in bold lines the noise reduction circuit portion of FIG. 2, which is used to reduce noise when current biasing the magneto resistive sensor RMR 202, in accordance with one embodiment of the present invention. FIG. 4 shows in bold lines the error correction circuit portion of FIG. 2, which is used to voltage bias the magneto resistive sensor RMR 202, in accordance with one embodiment of the present invention. FIG. 5 shows in bold lines the voltage bias circuit portion of FIG. 2, which is used to operate the magneto resistive sensor RMR 202 under voltage mode, in accordance with one embodiment of the present invention.

Figure 6:
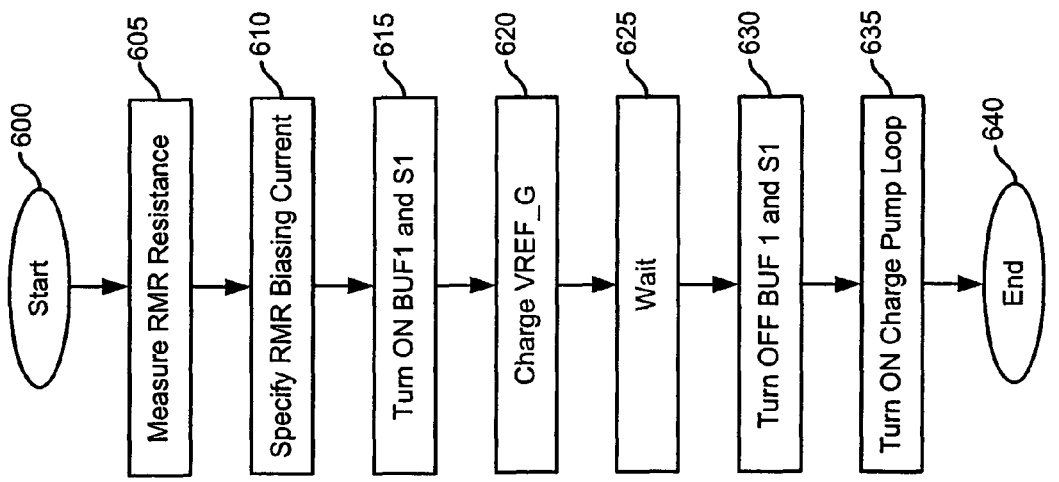
FIG. 6 is a flowchart showing the steps used to control the magneto resistive sensor when operating in current mode, in accordance with one embodiment of the present invention.

FIG. 6 is a flowchart showing the steps used to control the MR sensor when operating in current mode, in accordance with one embodiment of the present invention. These steps are used by the circuit to control the MR sensor when the sensor is operated in current mode. In step 600 the process initialization takes place and includes ascertaining whether the MR sensor will be operated in current mode. Next in step 605 the resistance of the external magneto-resistive sensor (RMR) 202 is measured. This step can be done individually or as part of step 600 or immediately after the circuit is powered up. In step 610, the RMR biasing current is specified by the user programmed I_CODE. Next in step 615, the first comparator (BUF1) 220 and first switch 221 are turned on during the speed up and when the regulator is turned on. In step 620, which can happen simultaneously with step 615, the VREF_G is charged up quickly in such a way the VREF1 matches VREF. The maximum voltage of VREF_1 is limited by the power supply. VREF_G is a low pass and heavily filtered (C1 with RF1) gate voltage of switch M2 224. The lowpass filter stabilizes quickly and in some embodiments VREF_G can stabilize in a period ranging from a few hundred nanoseconds to two microseconds and preferably within one microsecond. However in some embodiments this stabilization time can be made shorter. Next in step 625, the system waits for a predetermined period of time and after the period of time lapses first comparator (BUF1) 220 and first switch 221 are turned off in step 630. The predetermined amount of time can be set to be greater than the recovery time for the circuit including the first comparator (BUF1) 220 when the first switch 221 is turned on. In some embodiments the recovery time can range from a few hundred nanoseconds to about one microsecond. Next in step 635 and after first comparator (BUF1) 220 and first switch 221 are shut off, second comparator 232 and charge pump 234 are engaged establishing a charge pump loop. Finally in step 640 the process ends with second comparator 232 and charge pump 234 maintaining the VREF_G values after the first comparator (BUF1) 220 and first switch 221 are shut off in step 635.

Figure 7:
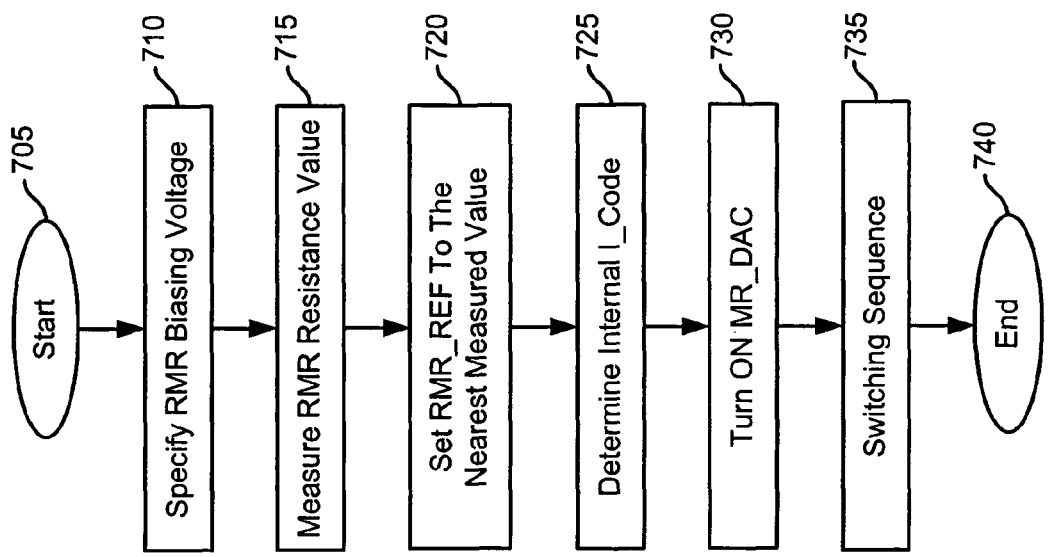
FIG. 7 is a flowchart showing the steps used to control the magneto resistive sensor when operating in voltage mode, in accordance with one embodiment of the present invention.

FIG. 7 is a flowchart showing the steps used to control the MR sensor when operating in voltage mode, in accordance with one embodiment of the present invention. These steps are used by the circuit to control the MR sensor when the sensor is operated in voltage mode. In step 705 the process initialization takes place, which includes ascertaining whether the MR sensor will be operated in voltage mode. In step 710, the RMR biasing voltage is specified by the user programmed V_CODE. Next in step 715, the external RMR resistor (RMR) resistance value is measured using the magneto resistive sensor (RMR) 202. Next in step 720, the internal reference resistor (RMR_REF) is set to the nearest measured value corresponding to the external resistance value of the RMR measured in step 715. In step 725 the internal I_CODE is determined by using the V_CODE and the measure RMR resistance from step 715. The I_CODE is the digital to analog code used to specify the amount of current that flows to the RMR 202. In one embodiment, in order to avoid overshoot the I_CODE, which is used, is lower than the exact value. Next in step 730 the MR_DAC 214 is turned on. In step 735 a switching sequence is engaged that causes the current flowing into the RMR 202 to be lower than the current specified. Further details of step 735 are given with reference to FIG. 8 below. Finally, the process ends in step 740, when the circuit has provided the MR voltage biasing. Although the resistance of the RMR 202 can range from about 25 to 100 ohms in some embodiments or from about 100 ohms to about 600 ohms in other embodiments, the MR voltage biasing across the RMR 202 is maintained from about 50 millivolts to 300 millivolts. In one example the biasing voltage is set to be 100 millivolts for an RMR resistance of 80 ohms and a biasing current of 1.25 milliamps.

Figure 8:
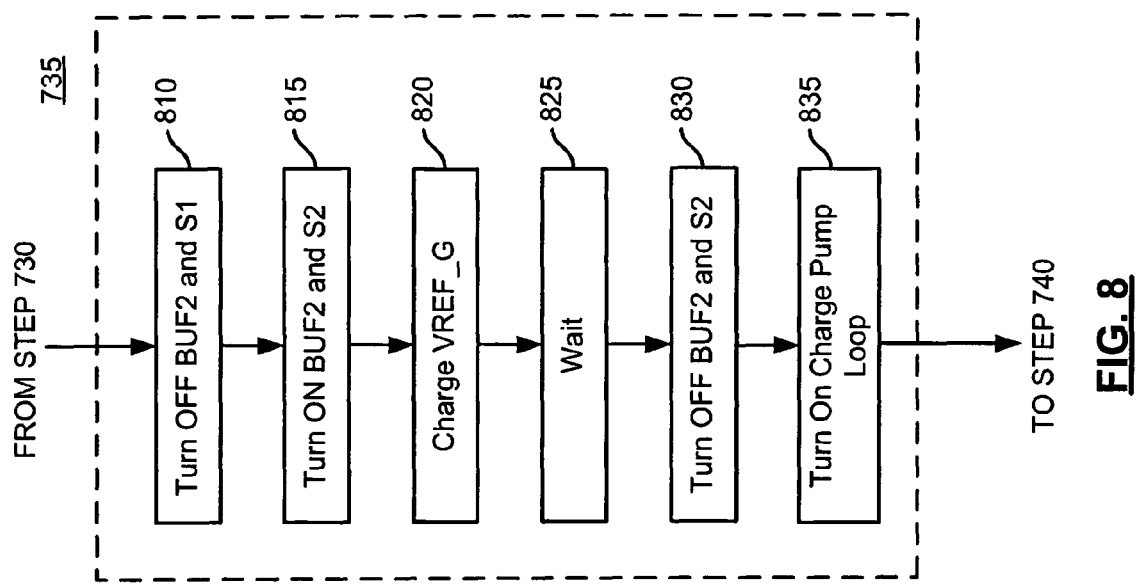
FIG. 8 is a flowchart showing further details of the switching sequence shown in step 735 of FIG. 7, in accordance with one embodiment of the present invention.

FIG. 8 is a flowchart showing further details of the switching sequence shown in step 735 of FIG. 7, in accordance with one embodiment of the present invention. These steps take effect after the MR_DAC 214 has been turned on in step 730.

The process begins in step 810 when the fourth comparator 240 and first switch 221 are turn off. Next in step 815 the fourth comparator 240 and the second switch 242 are turned on. In step 820, which can happen simultaneously with step 815, the VREF_G is charged up quickly in such a way the VREF1 matches VREF. VREF_G is a low pass and heavily filtered (C1 with RF1) gate voltage of switch M2 224. Next in step 825, the system waits for a predetermined period of time and after the period of time lapses the fourth comparator 240 and the second switch 242 are turned off in step 830. The predetermined amount of time can be set to be greater than the recovery time for the circuit including the fourth buffer 240 when the second switch 242 is turned on. In some embodiments the recovery time can range from a few hundred nanoseconds to about one microsecond. Next in step 835 and after fourth comparator 240 and second switch 242 are turned off, third comparator 244 and charge pump 234 are engaged establishing a charge pump loop. Although the fourth comparator 240 and the second switch 242 are turned off, third comparator 244 and charge pump 234 remain on and maintain the VREF_G voltage. After the fourth comparator 240 and the second switch 242 are turned off and the third comparator 244 along with charge pump 234 are engaged, which establishes the charge pump loop, t the process ends by returning to step 740 shown in FIG. 7.

In an alternative embodiment steps 635 and 835 of FIG. 6 and FIG. 8 respectively are changed so that a slow amplifier is used to maintain the charge on capacitor 222 instead of the charge pump 234. In this alternative embodiment a fast amplifier is used to charge capacitor 222 during the speed up (fast recovery period). However, since the fast amplifier is very noisy and has a low supply rejection, a very slow amplifier is used to maintain charge on capacitor 22 and therefore to maintain the VREF_G. In this alternative embodiment the first comparator (BUF1) 220 is a slow amplifier which also has a better supply rejection. Therefore, in this alternative embodiment a slow amplifier having good rejection is used instead of a charge pump 234 because the charge pump 234+ comparator 232 functions substantially similar to a slow amplifier having good rejection. As discussed above with reference to FIG. 2, rejection measures of the amount of interference voltage that is filtered out or rejected in a circuit and can be quantified with values such as the common mode rejection ratio (CMRR) so that an amplifier having a good rejection is an amplifier with a high CMRR.

Figure 9B:
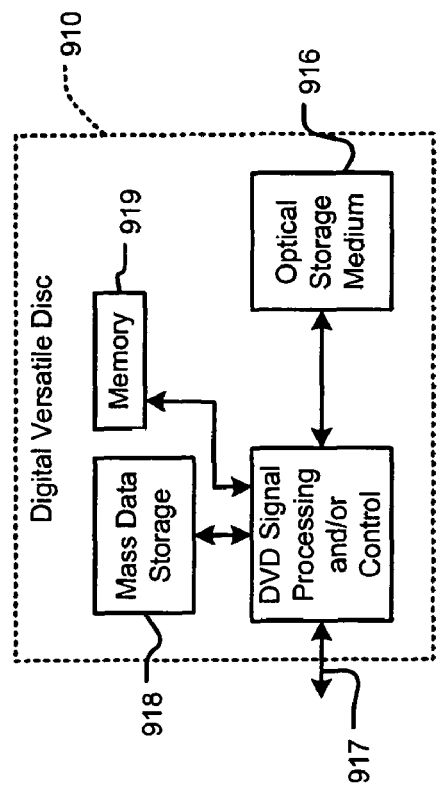
FIGS. 9A-9H illustrate various exemplary systems in which embodiments of the present invention are implemented.
Figure 9A:
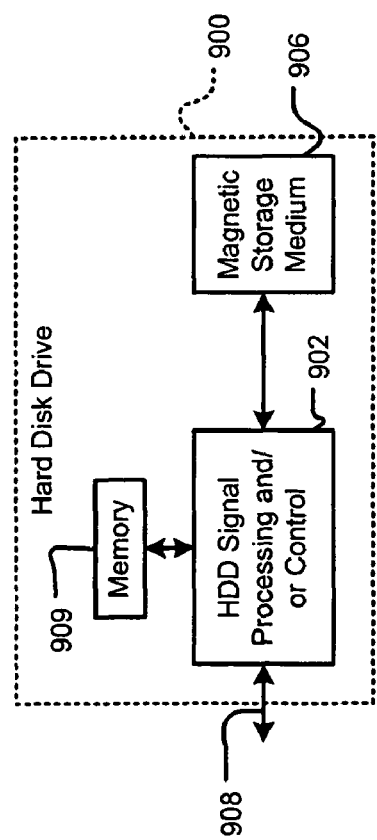

FIGS. 9A-9G show various exemplary systems in which the present invention is incorporated are shown. FIG. 9A is an illustration showing the present invention embodied in a hard disk drive 900. The present invention may be implemented in either or both signal processing and/or control circuits, which are generally identified in FIG. 9A at 902. In some implementations, signal processing and/or control circuit 902 and/or other circuits (not shown) in HDD 900 may process data, perform coding and/or encryption, perform calculations, and/or format data that is output to and/or received from a magnetic storage medium 906.

HDD 900 may communicate with a host device (not shown) such as a computer, mobile computing devices such as personal digital assistants, cellular phones, media or MP3 players and the like, and/or other devices via one or more wired or wireless communication links 908. HDD 900 may be connected to memory 909, such as random access memory (RAM), a low latency nonvolatile memory such as flash memory, read only memory (ROM) and/or other suitable electronic data storage.

FIG. 9B is an illustration showing the present invention embodied in a digital versatile disc (DVD) drive 910. The present invention may be implemented in either or both signal processing and/or control circuits, which are generally identified in FIG. 9B at 912, and/or mass data storage 918 of DVD drive 910. Signal processing and/or control circuit 912 and/or other circuits (not shown) in DVD 910 may process data, perform coding and/or encryption, perform calculations, and/or format data that is read from and/or data written to an optical storage medium 916. In some implementations, signal processing and/or control circuit 912 and/or other circuits (not shown) in DVD 910 can also perform other functions such as encoding and/or decoding and/or any other signal processing functions associated with a DVD drive.

DVD drive 910 may communicate with an output device (not shown) such as a computer, television or other device via one or more wired or wireless communication links 917. DVD 910 may communicate with mass data storage 918 that stores data in a nonvolatile manner. Mass data storage 918 may include a hard disk drive (HDD) such as that shown in FIG. 9A. The HDD may be a mini HDD that includes one or more platters having a diameter that is smaller than approximately 1.8". DVD 910 may be connected to memory 919, such as RAM, ROM, low latency nonvolatile memory such as flash memory, and/or other suitable electronic data storage.

Figure 9D:
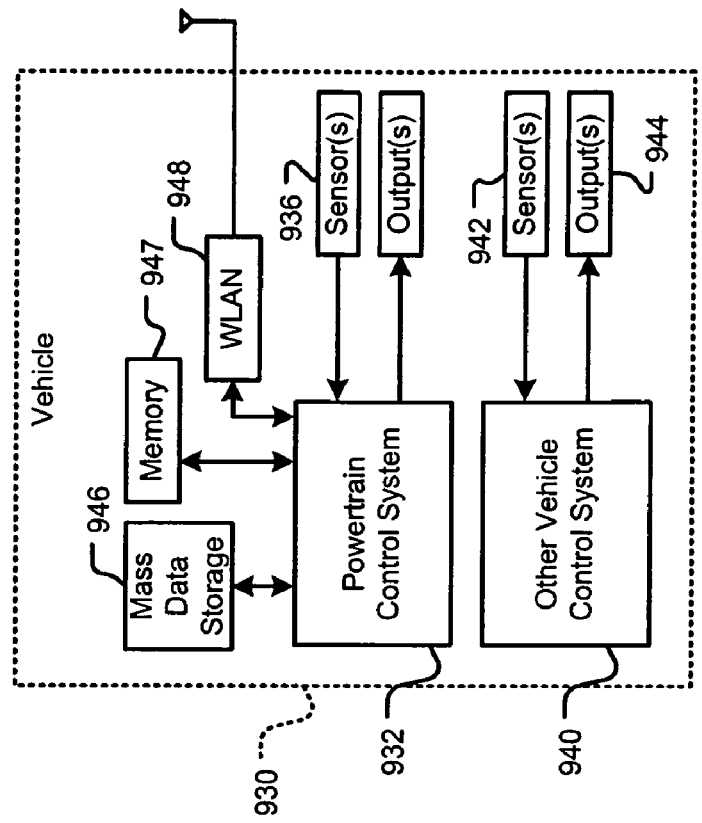
Figure 9C:
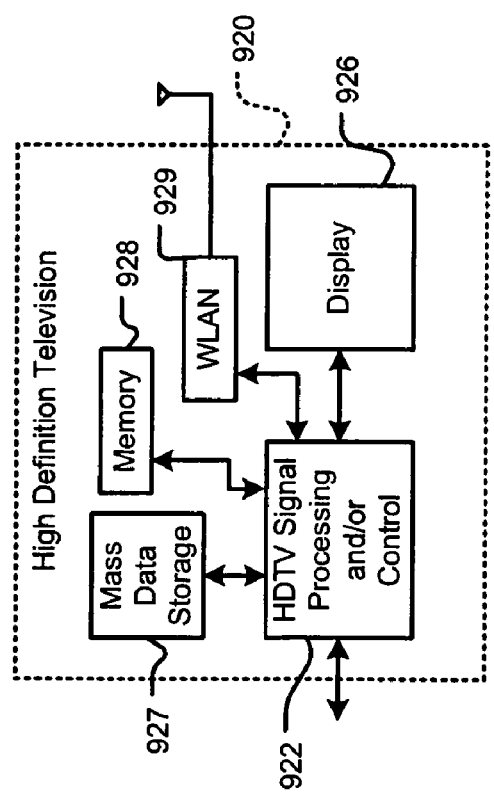

FIG. 9C is an illustration showing the present invention embodied in a high definition television (HDTV) 920. The present invention may be implemented in either or both signal processing and/or control circuits, which are generally identified in FIG. 9C at 922, a WLAN interface and/or mass data storage of the HDTV 920. HDTV 920 receives HDTV input signals in either a wired or wireless format and generates HDTV output signals for a display 926. In some implementations, signal processing circuit and/or control circuit 922 and/or other circuits (not shown) of HDTV 920 may process data, perform coding and/or encryption, perform calculations, format data and/or perform any other type of HDTV processing that may be required.

HDTV 920 may communicate with mass data storage 927 that stores data in a nonvolatile manner such as optical and/or magnetic storage devices. At least one HDD may have the configuration shown in FIG. 9A and/or at least one DVD may have the configuration shown in FIG. 9B. The HDD may be a mini HDD that includes one or more platters having a diameter that is smaller than approximately 1.8". HDTV 920 may be connected to memory 928 such as RAM, ROM, low latency nonvolatile memory such as flash memory and/or other suitable electronic data storage. HDTV 920 also may support connections with a WLAN via a WLAN network interface 929.

FIG. 9D is an illustration showing the present invention implemented in a control system of a vehicle 930, a WLAN interface and/or mass data storage of the vehicle control system. A power train control system 932 receives inputs from one or more sensors such as temperature sensors, pressure sensors, rotational sensors, airflow sensors and/or any other suitable sensors and/or that generates one or more output control signals such as engine operating parameters, transmission operating parameters, and/or other control signals.

The present invention may also be embodied in other control systems 940 of vehicle 930. Control system 940 may likewise receive signals from input sensors 942 and/or output control signals to one or more output devices 944. In some implementations, control system 940 may be part of an anti-lock braking system (ABS), a navigation system, a telemetric system, a vehicle telemetric system, a lane departure system, an adaptive cruise control system, a vehicle entertainment system such as a stereo, DVD, compact disc and the like. Still other implementations are contemplated.

Powertrain control system 932 may communicate with mass data storage 946 that stores data in a nonvolatile manner. Mass data storage 946 may include optical and/or magnetic storage devices for example hard disk drives HDD and/or DVDs. At least one HDD may have the configuration shown in FIG. 9A and/or at least one DVD may have the configuration shown in FIG. 9B. The HDD may be a mini HDD that includes one or more platters having a diameter that is smaller than approximately 1.8". Powertrain control system 932 may be connected to memory 947 such as RAM, ROM, low latency nonvolatile memory such as flash memory and/or other suitable electronic data storage. Powertrain control system 932 also may support connections with a WLAN via a WLAN network interface 948. The control system 940 may also include mass data storage, memory and/or a WLAN interface (all not shown).

Figure 9E:
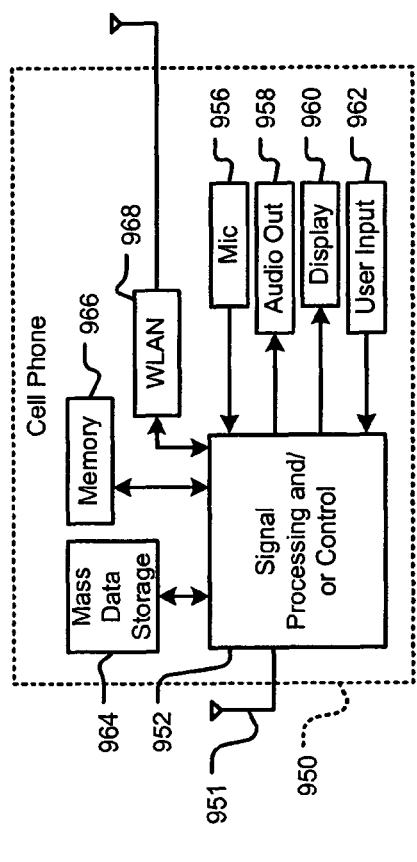

FIG. 9E is an illustration showing the present invention embodied in a cellular phone 950 that may include a cellular antenna 951. The present invention may be implemented in either or both signal processing and/or control circuits, which are generally identified in FIG. 9E at 952, a WLAN interface and/or mass data storage of the cellular phone 950. In some implementations, cellular phone 950 includes a microphone 956, an audio output 958 such as a speaker and/or audio output jack, a display 960 and/or an input device 962 such as a keypad, pointing device, voice actuation and/or other input device. Signal processing and/or control circuits 952 and/or other circuits (not shown) in cellular phone 950 may process data, perform coding and/or encryption, perform calculations, format data and/or perform other cellular phone functions.

Cellular phone 950 may communicate with mass data storage 964 that stores data in a nonvolatile manner such as optical and/or magnetic storage devices for example hard disk drives HDD and/or DVDs. At least one HDD may have the configuration shown in FIG. 9A and/or at least one DVD may have the configuration shown in FIG. 9B. The HDD may be a mini HDD that includes one or more platters having a diameter that is smaller than approximately 1.8". Cellular phone 950 may be connected to memory 966 such as RAM, ROM, low latency nonvolatile memory such as flash memory and/or other suitable electronic data storage. Cellular phone 950 also may support connections with a WLAN via a WLAN network interface 968.

Figure 9F:
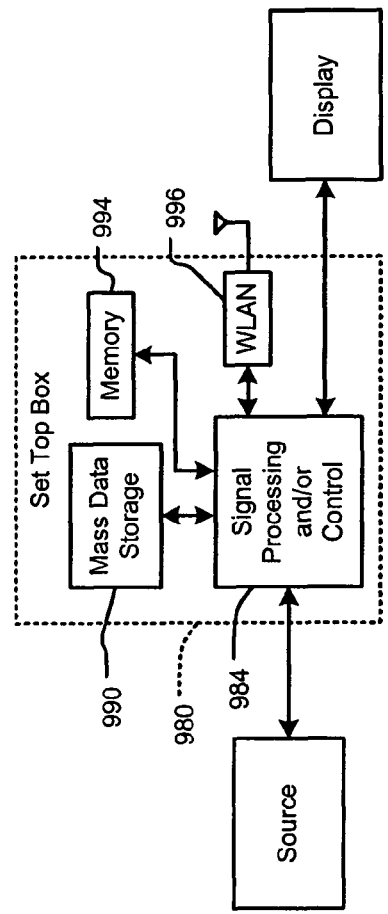

FIG. 9F is an illustration showing the present invention embodied in a set top box 980. The present invention may be implemented in either or both signal processing and/or control circuits, which are generally identified in FIG. 9F at 984, a WLAN interface and/or mass data storage of the set top box 980. Set top box 980 receives signals from a source such as a broadband source and outputs standard and/or high definition audio/video signals suitable for a display 988 such as a television and/or monitor and/or other video and/or audio output devices. Signal processing and/or control circuits 984 and/or other circuits (not shown) of the set top box 980 may process data, perform coding and/or encryption, perform calculations, format data and/or perform any other set top box function.

Set top box 980 may communicate with mass data storage 990 that stores data in a nonvolatile manner. Mass data storage 990 may include optical and/or magnetic storage devices for example hard disk drives HDD and/or DVDs. At least one HDD may have the configuration shown in FIG. 9A and/or at least one DVD may have the configuration shown in FIG. 9B. The HDD may be a mini HDD that includes one or more platters having a diameter that is smaller than approximately 1.8". Set top box 980 may be connected to memory 994 such as RAM, ROM, low latency nonvolatile memory such as flash memory and/or other suitable electronic data storage. Set top box 980 also may support connections with a WLAN via a WLAN network interface 996.

Figure 9G:
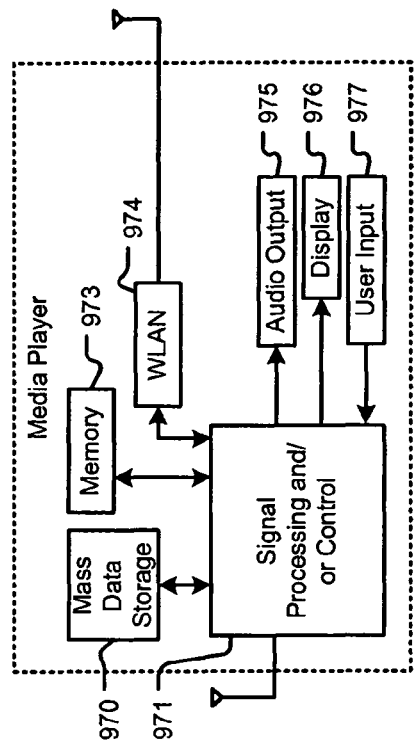

FIG. 9G is an illustration showing the present invention embodied in a media player 972. The present invention may be implemented in either or both signal processing and/or control circuits, which are generally identified in FIG. 9G at 971, a WLAN interface and/or mass data storage of the media player 972. In some implementations, media player 972 includes a display 976 and/or a user input 977 such as a keypad, touchpad and the like. In some implementations, media player 972 may employ a graphical user interface (GUI) that typically employs menus, drop down menus, icons and/or a point-and-click interface via display 976 and/or user input 977. Media player 972 further includes an audio output 975 such as a speaker and/or audio output jack. Signal processing and/or control circuits 971 and/or other circuits (not shown) of media player 972 may process data, perform coding and/or encryption, perform calculations, format data and/or perform any other media player function.

Media player 972 may communicate with mass data storage 970 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices for example hard disk drives HDD and/or DVDs. At least one HDD may have the configuration shown in FIG. 9A and/or at least one DVD may have the configuration shown in FIG. 9B. The HDD may be a mini HDD that includes one or more platters having a diameter that is smaller than approximately 1.8". Media player 972 may be connected to memory 973 such as RAM, ROM, low latency nonvolatile memory such as flash memory and/or other suitable electronic data storage. Media player 972 also may support connections with a WLAN via a WLAN network interface 974.

Figure 9H:
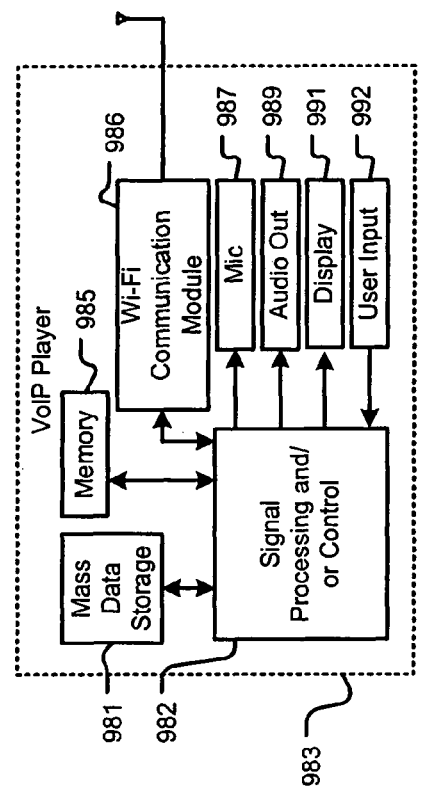

FIG. 9H is an illustration showing the present invention embodied in a Voice over Internet Protocol (VoIP) phone 983 that may include an antenna 939. The present invention may be implemented in either or both signal processing and/or control circuits, which are generally identified in FIG. 9H at 982, a wireless interface and/or mass data storage of the VoIP phone 983. In some implementations, VoIP phone 983 includes, in part, a microphone 987, an audio output 989 such as a speaker and/or audio output jack, a display monitor 991, an input device 992 such as a keypad, pointing device, voice actuation and/or other input devices, and a Wireless Fidelity (Wi-Fi) communication module 986. Signal processing and/or control circuits 982 and/or other circuits (not shown) in VoIP phone 983 may process data, perform coding and/or encryption, perform calculations, format data and/or perform other VoIP phone functions.

VoIP phone 983 may communicate with mass data storage 502 that stores data in a nonvolatile manner such as optical and/or magnetic storage devices, for example hard disk drives HDD and/or DVDs. At least one HDD may have the configuration shown in FIG. 9A and/or at least one DVD may have the configuration shown in FIG. 9B. The HDD may be a mini HDD that includes one or more platters having a diameter that is smaller than approximately 1.8". VoIP phone 983 may be connected to memory 985, which may be a RAM, ROM, low latency nonvolatile memory such as flash memory and/or other suitable electronic data storage. VoIP phone 983 is configured to establish communications link with a VoIP network (not shown) via Wi-Fi communication module 986. Still other implementations in addition to those described above are contemplated.

The above description of exemplary embodiments of the invention has been presented for purposes of illustration and description. It is not intended to be exhaustive or to limit the invention to the precise form described, and many modifications and variations are possible in light of the teaching above. Thus, the embodiments were chosen and described in order to best explain the principles of the invention and its practical applications to thereby enable others skilled in the art to best utilize the invention in various embodiments and with various modifications as are suited to the particular use contemplated.

What is claimed is:

1. A circuit comprising:
    a current biasing circuit configured to supply a current bias to a transducer, said current biasing circuit comprising a servo circuit and a variable reference resistor having a resistance set based on a measured resistance of the transducer;
    a voltage biasing circuit configured to supply a voltage bias to said transducer, said voltage biasing circuit further comprising an error correction circuit configured to adjust a voltage at an output node to be between a first reference voltage and a second reference voltage; and
    a charge pump configured to maintain said voltage at said output node between said first reference voltage and said second reference voltage.

2. The circuit of claim 1 wherein said circuit is implemented as an integrated circuit.

3. The circuit of claim 1 further comprising a switch to engage either said current biasing circuit or said voltage biasing circuit.

4. The circuit of claim 1 wherein said charge pump is coupled to a switch for engaging either said current biasing circuit or said voltage biasing circuit.

5. The circuit of claim 1 wherein said error correction circuit further comprises an adjustable resistor.

6. The circuit of claim 1 further comprising a noise reduction circuit coupled to said charge pump, wherein said noise reduction circuit is configured to reduce a noise within said circuit.

7. The circuit of claim 1 further comprising a programmable resistor, said programmable resistor configured to be programmed to maintain said voltage at said output node between said first reference voltage and said second reference voltage.

8. The circuit of claim 1 wherein said servo circuit further comprises a first comparator coupled to a first switch for engaging said servo circuit to a magneto resistive digital to analog converter.

9. The circuit of claim 1 wherein said voltage biasing circuit further includes an input coupled to a comparator, wherein said comparator is coupled to said transducer.

10. The circuit of claim 1 wherein said charge pump is coupled to a first comparator and a second comparator, said first comparator configured to produce an output to said charge pump if the current biasing circuit is active and said second comparator configured to produce an output to said charge pump if the voltage circuit is active.

11. A circuit of claim 1, wherein the charge pump is configured to maintain the current bias supplied by the current biasing circuit, and to maintain the voltage bias supplied by the voltage bias circuit.

12. A method for biasing a magneto resistive sensor, the method comprising:
    measuring a resistance of said magneto resistive sensor;
    setting a variable reference resistor to have an internal reference resistance value that is substantially near said measured resistance of said magneto resistive sensor;
    determining an amount of current needed by said magneto resistive sensor; and
    adjusting a voltage at an output node to be between a first reference voltage and a second reference voltage using this determined current.

13. The method of claim 12 further comprising the step of specifying said magneto resistive biasing voltage.

14. The method of claim 12 further comprising the steps of:
    turning off a first comparator and a first switch;
    turning on said first comparator and a second switch; and
    turning off said first comparator and said second switch.

15. The method of claim 14 further comprising the step of waiting for a period of time after said first comparator and said second switch are turned on before turning off said first comparator and said second switch.

16. The method of claim 14 further comprising adjusting a voltage at a node coupled to said magneto resistive sensor to match a programmed voltage.

17. The method of claim 14 further comprising using a charge pump to maintain said voltage at the magneto resistive sensor after said first comparator and said second switch have been turned off.

18. A method of operation comprising:
    operating a circuit in current mode to adjust the current bias applied to a magneto resistive sensor;
    operating said circuit in voltage mode to adjust the voltage bias applied to said magneto resistive sensor; and
    switching between said current mode of operation and said voltage mode of operation for voltage biasing a magneto resistive sensor for fast recovery,
    wherein operating said circuit in voltage mode comprises:
        measuring a resistance of said magneto resistive sensor; and
        setting a variable reference resistor to have an internal reference resistance value that is substantially near said measured resistance of said magneto resistive sensor.

19. The method of claim 18 wherein said step of operating a circuit in current mode further comprises:
    specifying a magneto resistive biasing voltage;
    turning on a first comparator and a first switch during a speed up process so that a reference gate voltage is charged up; and
    turning off said first comparator and said first switch.

20. The method of claim 19 further comprising the step of waiting for a period of time after said first comparator and said first switch are turned on before turning off said first comparator and a second switch.

21. The method of claim 19 further comprising maintaining said reference gate voltage after said first comparator and said first switch have been turned off.

22. The method of claim 18 wherein said step of operating a circuit in voltage mode further comprises:
    determining an amount of current needed by said magneto resistive sensor; and
    adjusting a voltage at an output node to be between a first reference voltage and a second reference voltage using this determined current.

23. The method of claim 22 further comprising the steps of:
    turning off a first comparator and a first switch;
    turning on said first comparator and a second switch; and
    turning off said first comparator and said second switch.

24. The method of claim 23 further comprising the step of waiting for a period of time after said first comparator and said second switch are turned on before turning off said first comparator and said second switch.

25. The method of claim 23 further comprising adjusting said voltage at said magneto resistive sensor to match a programmed voltage.

26. The method of claim 23 further comprising maintaining said voltage at the magneto resistive sensor after said first comparator and said second switch have been turned off.

27. The method of claim 18 wherein said step of switching between said current mode of operation and said voltage mode of operation further comprising engaging a charge pump to maintain the voltage settings after the switching has occurred.

* * * * *